United States Patent
Allais et al.

(10) Patent No.: US 9,598,322 B2
(45) Date of Patent: Mar. 21, 2017

(54) PROCESS FOR PREPARING AN EMULSION OF ELEMENTAL SULPHUR PARTICLES

(71) Applicant: SHELL OIL COMPANY, Houston, TX (US)

(72) Inventors: Cyrille Paul Allais, Amsterdam (NL); Klaas Jan Hutter, Pocatello, ID (US); Rafael Alberto Garcia Martinez, Calgary (CA)

(73) Assignee: SHELL OIL COMPANY, Houston, TX (US)

( * ) Notice: Subject to any disclaimer, the term of this patent is extended or adjusted under 35 U.S.C. 154(b) by 297 days.

(21) Appl. No.: 14/413,232

(22) PCT Filed: Jul. 8, 2013

(86) PCT No.: PCT/EP2013/064416
§ 371 (c)(1),
(2) Date: Jan. 7, 2015

(87) PCT Pub. No.: WO2014/009326
PCT Pub. Date: Jan. 16, 2014

(65) Prior Publication Data
US 2015/0175492 A1 Jun. 25, 2015

Related U.S. Application Data

(60) Provisional application No. 61/669,426, filed on Jul. 9, 2012.

(51) Int. Cl.
C05D 9/00 (2006.01)
C05D 9/02 (2006.01)
(Continued)

(52) U.S. Cl.
CPC ............ *C05G 3/0005* (2013.01); *C05B 17/00* (2013.01); *C05C 9/00* (2013.01); *C05C 9/005* (2013.01);
(Continued)

(58) Field of Classification Search
None
See application file for complete search history.

(56) References Cited

U.S. PATENT DOCUMENTS 3,100,698 A    8/1963   Horsley et al.
3,697,245 A * 10/1972   Dilday ............................. 71/28
(Continued)

FOREIGN PATENT DOCUMENTS

NZ       213682      10/1985
NZ       213682      11/1988
(Continued)

*Primary Examiner* — Wayne Langel
(74) *Attorney, Agent, or Firm* — Charles W. Stewart

(57) ABSTRACT

The invention provides a process for the preparation an emulsion of elemental sulphur particles, said process comprising the steps of: (a) providing a first stream comprising a liquid fertilizer and/or a liquid fertilizer precursor; (b) providing a second stream comprising liquid elemental sulphur; and (c) mixing the first stream and the second stream in a mixing device in the presence of a multifunctional ionic surfactant to form an emulsion comprising elemental sulphur particles which are coated with a layer of the multifunctional ionic surfactant and dispersed in the fertilizer and/or the fertilizer precursor, whereby a temperature is applied which maintains the elemental sulphur substantially in the liquid form in the mixing device. The invention further provides an elemental sulphur-containing fertilizer obtainable by a process according to the invention.

31 Claims, 1 Drawing Sheet

(51) Int. Cl.
    *C05C 9/00*     (2006.01)
    *C05G 3/00*     (2006.01)
    *C05B 17/00*    (2006.01)

(52) U.S. Cl.
    CPC .............. *C05D 9/02* (2013.01); *C05G 3/00* (2013.01); *C05G 3/007* (2013.01)

(56) References Cited

U.S. PATENT DOCUMENTS

| | | | |
|---|---|---|---|
| 3,725,029 A * | 4/1973 | Blackmore | 71/28 |
| 4,330,319 A | 5/1982 | Bexton et al. | |
| 4,372,872 A | 2/1983 | Backlund | |
| 4,832,728 A * | 5/1989 | Allan et al. | 71/29 |
| 6,331,193 B1 * | 12/2001 | Phinney | 23/313 P |
| 7,998,235 B2 | 8/2011 | Kohnke et al. | |
| 2007/0095118 A1 * | 5/2007 | Evers et al. | 71/28 |
| 2010/0288005 A1 | 11/2010 | Schromm et al. | |
| 2011/0302973 A1 * | 12/2011 | Antens et al. | 71/23 |
| 2011/0302975 A1 * | 12/2011 | Antens et al. | 71/27 |
| 2012/0036906 A1 * | 2/2012 | Pedersen | 71/23 |
| 2012/0128981 A1 * | 5/2012 | Iyer | 428/402 |
| 2012/0272702 A1 * | 11/2012 | Garcia Martinez et al. | 71/34 |

FOREIGN PATENT DOCUMENTS

| | | |
|---|---|---|
| WO | 03106376 | 12/2003 |
| WO | 2010058038 | 5/2010 |
| WO | 2010086395 | 8/2010 |
| WO | 2010086396 | 8/2010 |
| WO | 2010102389 | 9/2010 |
| WO | 2012118532 | 9/2012 |
| WO | 2013098404 | 7/2013 |
| WO | 2014009326 | 1/2014 |

* cited by examiner

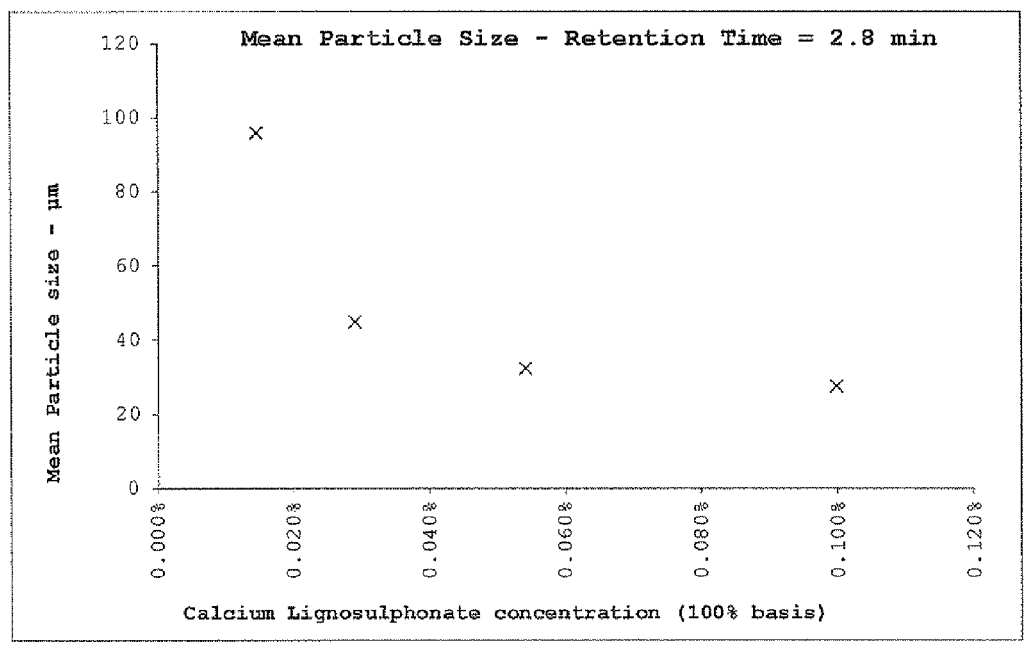

PROCESS FOR PREPARING AN EMULSION OF ELEMENTAL SULPHUR PARTICLES

PRIORITY CLAIM

The present application is the National Stage (§371) of International Application No. PCT/EP2013/064416, filed Jul. 8, 2013, which claims priority from U.S. Provisional Application No. 61/669,426, filed Jul. 9, 2012, the disclosures of which are incorporated herein by reference.

FIELD OF THE INVENTION

The present invention provides a process for the preparation of an emulsion of elemental sulphur particles, and an elemental sulphur-containing fertilizer obtainable by said process.

BACKGROUND OF THE INVENTION

Increased demand for sulphur-containing fertilizers steins from the discovery that low crop yields in certain cases may be related to deficiencies in sulphur in the soil. An example of a species with high sulphur requirements is Canola. Canola is an important cash crop in Alberta, Canada, and has high sulphur requirements at any growth stage. A shortage of sulphur can cause serious reductions in crop yield and quality.

Manufacturing processes for sulphur-containing fertilizers of the phosphate type often involve the use or incorporation of sulphates. A disadvantage of sulphates is that they are very mobile in the soil and easily leach out of the root zone, effectively making the sulphate nutrient unavailable to the plants. Elemental sulphur is not leached out of the soil as readily as sulphates. Instead, micron-sized elemental sulphur particles (e.g. with size from 1 to 200 µm) are oxidized to sulphate sulphur, which is the form utilized by the plants, by soil bacteria during the cropping season. Elemental sulphur can therefore be considered a slow (timed) release form of plant nutrient sulphur that is less prone to leaching out of the crops root zone. It is, therefore, advantageous to have a large proportion of the sulphur in fertilizers present as elemental sulphur. Furthermore, elemental sulphur offers some additional benefits in agriculture, including acting as a fungicide against certain micro organisms, acting as a pesticide against certain soil and plant pests, assisting the decomposition of plant residues and improving phosphorus and nitrogen nutrient utilization and reducing the pH of alkaline and calcareous soils.

Thus, it is advantageous to incorporate sulphur in sulphur-containing fertilizers as elemental sulphur.

Processes for the manufacture of sulphur-containing fertilizers, wherein elemental sulphur is used, are known in the art.

NZ 213682 discloses a method for providing sulphur for use in a sulphur-containing fertilizer wherein liquid sulphur is added to phosphoric acid, wherein the phosphoric acid is in a high energy state of shear in a high energy vortex.

U.S. Pat. No. 4,372,872 discloses a process wherein a suspension of sulphur is produced by agitating an aqueous medium with a high shear mixer, and introducing sulphur (in particulate or molten form} into the agitated medium. The sulphur suspensions can be applied to the soil. The dispersions obtained by this process have the disadvantage that the particle size and particle size distribution of the elemental sulphur-containing fertilizer obtained leave considerable room for improvement as sulphur will separate from the continuous phase if left without intense agitation.

WO 2010/102389 discloses a process for converting lump sulphur into a micron sized powder whereby the sulphur is micronized in the molten form in a superheated dispersant solution. Said process is a continuous process.

The use of superheated dispersant solution involves preparing the dispersant solution and effecting the micronisation under pressure, thus expending high amounts of energy in doing such.

US 2010 288005 discloses a method for producing tablets made of a mixture of a plurality of materials, and a method for producing a sulfurous fertilizer whereby the tablets are formed using a drop former whereby the sulphurous fertilizer is micronized by application of ultrasonic sound immediately upstream of, or within the drop former.

U.S. Pat. No. 4,330,319 discloses a process for the manufacture of urea sulphur fertilizer whereby the sulphur has a particle size of smaller than about 100 micron and whereby molten sulphur and molten urea are passed through a mixing device through which a pressure drop of at least 200 kPA is applied.

U.S. Pat. No. 7,998,235 discloses a method for the production of a urea fertilizer with elemental sulphur from sulphur in liquid stage and a liquid urea melt. The method uses an additive that is temperature stable and amphoteric.

Object of the present invention is to provide a low energy method for preparing a stable emulsion of micro-encapsulated molten elemental sulphur in a liquid, that also display an improved particle size and particle size distribution.

In addition, the present invention provides a process for preparing an elemental sulphur-containing fertilizer, wherein the particle size of the elemental sulphur particles can be easily controlled.

SUMMARY OF THE INVENTION

Accordingly, the present invention provides a method for preparing an emulsion of elemental sulphur particles, said process comprising the steps of:

(a) providing a first stream comprising a liquid fertilizer and/or a liquid fertilizer precursor;

(b) providing a second stream comprising liquid elemental sulphur; and (c) mixing the first stream and the second stream in a mixing device in the presence of a multifunctional ionic surfactant to form an emulsion comprising elemental sulphur particles which are coated with a layer of the multifunctional ionic surfactant and dispersed in the fertilizer and/or the fertilizer precursor, whereby a temperature is applied which maintains the elemental sulphur substantially in the liquid form in the mixing device.

Further, the emulsion of elemental sulphur particles as obtained in step (c) can be subjected to one or more further processing steps to obtain an elemental sulphur fertilizer.

The present process enables the preparation of elemental sulphur-containing fertilizer products in which the sulphur particles have the correct particle size and particle size distribution for agronomical applications.

The actual size and size distribution of the sulphur particles in the fertilizer product can be selected for example dependent on the agricultural environments (e.g. soil and climatic conditions) for which the fertilizer is intended.

A major advantage of the present invention is that the particle size can be controlled over a relatively broad concentration range of the multifunctional ionic surfactant to be used, allowing also higher concentrations of the multifunctional ionic surfactant to be used for the production of sulphur particles having a small particle size.

Another advantage of the present invention is that the micro-encapsulated elemental sulphur particles are coated with a layer of the multifunctional ionic surfactant which provides a stable, non-coalescing and non-agglomerating dispersion of the elemental sulphur particles in further processing steps. Moreover, the latter phenomenon can attractively be established at different energy input levels.

BRIEF DESCRIPTION OF DRAWINGS

FIG. 1 is a visual representation of the relationship between the concentration of calcium lignosulphonate and the mean particle size of the dispersed sulpher.

DETAILED DESCRIPTION OF THE INVENTION

In accordance with the present invention the liquid elemental-sulphur is dispersed in the liquid fertilizer and/or a liquid fertilizer in the presence of a multifunctional ionic surfactant to obtain a stable emulsion of elemental sulphur particles.

The emulsion as obtained in step (c) can be subjected to one or more further processing steps to obtain an elemental sulphur-containing fertilizer. The one or more further processing steps comprise subjecting the emulsion to a forming process to obtain the elemental sulphur-containing fertilizer. The forming process can suitably be a granulating process, a prilling process, a compaction process, a tablet forming process, or a compressing process.

In another embodiment of the present invention the first stream in step (a) comprises a liquid fertilizer precursor, and the one or more further processing steps to which the emulsion of elemental sulphur particles as obtained in step (c) can be subjected comprise combining the emulsion as obtained in step (c) with one or more further components to obtain a mixture of the emulsion and the one or more further components, and granulating the mixture so obtained in a granulator unit to obtain granulated elemental sulphur-containing fertilizer.

In accordance with the present invention a temperature is applied which maintains the elemental sulphur substantially in the liquid (molten) form in the mixing device. In the context of the present invention "substantially in the liquid form" means that at least 70% of the elemental sulphur is in the liquid form in the mixing device. Preferably, at least 80% of the elemental sulphur is in the liquid form in the mixing device. More preferably, at least 90% of the elemental sulphur is in the liquid form in the mixing device, and even more preferably at least 99%.

In accordance with the present invention an emulsion is obtained of elemental sulphur particles. The elemental sulphur particles are coated with a layer of the multifunctional ionic surfactant. Suitably, the elemental-sulphur particles are entirely encapsulated by means of a layer of the multifunctional ionic surfactant. The elemental sulphur particles in the emulsion can suitably have an average particle size in the range of from 1-500 micrometer, preferably in the range of from 5-200 micrometer.

Suitably, the first stream has a temperature in the range of from 60-200° C., and the second stream has a temperature in the range of from 115-200° C. Preferably, the first stream has a temperature in the range of from 80-150° C., and the second stream has a temperature in the range of from 120-150° C.

In accordance with the present invention the mixing in step (c) is carried out a temperature at which the elemental sulphur is maintained substantially in the liquid form. Suitably, the temperature applied in step (c) is therefore more than 115° C., preferably more than 120° C.

Preferably, the mixing in step (c) is therefore carried out at a temperature of more than 80° C. but, preferably more than 115, at most 200° C., more preferably at a temperature of more than 120° C. but at most 150° C.

Suitably, the fertilizer precursor to be used in accordance with the present invention comprises an aqueous solution of phosphoric acid, an aqueous solution of ammonium phosphate, an aqueous solution of ammonium sulphate or any combination thereof. Preferably, the liquid fertilizer precursor comprises an aqueous solution of phosphoric acid.

The first stream to be provided in step (a) preferably comprises urea.

In accordance with the present invention the mixing in step (c) is carried out in the presence of a multifunctional ionic surfactant. In the context of the present invention a multifunctional ionic surfactant is defined as an ionic surfactant which has two or more functional properties. Suitably, the multifunctional ionic surfactant to be used in accordance with the present invention reduces the viscosity of the elemental sulphur dispersion produced in step (c). Moreover, it stabilizes the emulsion formed in step (c) through coating of individual elemental sulphur particles thus providing a stable, non-coalescing and non-agglomerating dispersion of micro-encapsulated sulphur particles in further processing steps.

Preferably, the multifunctional ionic surfactant comprises an anionic surfactant. (Examples of suitable anionic surfactants include soaps, sulphates, sulphonates, phosphites, phosphates, phosphonates, ionic polymeric surfactants, and lignosulphonates. Preferably, the multifunctional ionic surfactant comprises a material derived from the Lignin family of chemicals such as a lignosulphonate. Examples of suitable lignosulphonates include ammonium lignosulphonate, sodium lignosulphonate, calcium lignosulphonate, potassium lignosulphonate. Preferably, the lignosulphonate comprises calcium lignosulphonate.

The multifunctional ionic surfactant to be used in accordance with the present invention may be added to the first stream of fertilizer and/or fertilizer precursor before the elemental sulphur is mixed with the fertilizer and/or fertilizer precursor in step (c), or the multifunctional ionic surfactant may be added to the second stream comprising molten elemental sulphur, or the multifunctional ionic surfactant may be added as a separate stream. In accordance with the present invention one or more multifunctional ionic surfactants may be used.

Typically, the one or more multifunctional ionic surfactants are added in such an amount that the elemental sulphur-containing fertilizer prepared in accordance with the present invention comprises from 0.001 to 5.0 wt. % multifunctional ionic surfactant, preferably from 0.01 wt. % to 1.5 wt. %, based on the total weight of the granulated fertilizer.

In step (c) use is made of a mixing device. The mixing device to be used in step (c) can suitably be a dispersion mill wherein a rotor turns within a slotted stator or a static mixer. Preferably, the mixing device is a dispersion mill.

In a particularly attractive embodiment of the present invention, step (c) is carried out in a continuous mode of operation.

Suitably, in accordance with the present invention the particle size and particle size distribution of the micro-encapsulated elemental sulphur particles in the emulsion as obtained in step (c) is attractively controlled.

In a particular attractive embodiment of the present invention, the process for preparing an elemental sulphur-containing fertilizer, comprises steps of:

(a) providing a first stream which comprises liquid (molten) urea;

(b) providing a second stream comprising liquid elemental sulphur;

(c) mixing the first stream and the second stream in a mixing device in the presence of a multifunctional ionic surfactant to form an emulsion comprising micro-encapsulated elemental sulphur particles which are coated with a layer of the multifunctional ionic surfactant and dispersed in the fertilizer and/or the fertilizer precursor, whereby a temperature is applied of more than 135° C. which maintains the elemental sulphur and the urea substantially in the liquid form in the mixing device; and (d) subjecting the emulsion as obtained in step (c) to one or more further processing steps to obtain the elemental-sulphur fertilizer.

In a preferred embodiment of the present invention, liquid elemental sulphur is micro-encapsulated in a dispersion mill, wherein a rotor turns within a slotted stator, thereby providing a dispersion of milled elemental sulphur in the liquid.

In another embodiment of the present invention, the mixing device as used in step (c) is a mixer which does not comprise a moving part. Examples of suitable mixers which do not comprise a moving part are static mixers. Static mixers include a housing which may be cylindrical or squared in which the phases to be mixed flow in and out, and non-moving internals which are designed to induce mixing of the phases.

The elemental sulphur used may be high purity (>99.9% S) chemical sulphur as obtained from the Claus process. However, the process of the present invention can use elemental sulphur of significantly lower purity than this. Examples of such elemental sulphur containing materials are sulphur filter cake as obtained from sulphur melting and filtration operations and sulphur obtained from a various chemical and biological $H_2S$ gas removal processes. Typically, such sulphur sources may contain anywhere in the range of from 30 to 99.9 wt. %, preferably from 50 to 99.5 wt. %, more preferably from 60 to 99.0 wt. %, sulphur.

In accordance with the present invention part of the elemental sulphur may also be replaced by contaminated sulphur. The contaminated sulphur which can be used in the process of the present process of the present invention has less purity than the elemental sulphur to be used. Actually, the contaminated sulphur will usually be of significantly less purity than the elemental sulphur to be used. Examples of the contaminated elemental sulphur are materials such as sulphur filter cake as obtained from sulphur melting and filtration operations, operations such as Frasch sulphur mining or other mining operations, sulphuric acid manufacturing processes, and oil and gas treating processes such as various chemical and biological $H_2S$ gas removal processes. Typically, such contaminated sulphur sources may contain anywhere in the range of from 30 to 99.9 wt. %, preferably from 50 to 99.5 wt. %, more preferably from 50 to 80 wt. %, elemental sulphur with the balance comprising lime, gypsum, silica, iron and other trace materials.

Preferably, the contaminated sulphur to be used in accordance with the present invention is sulphur filter cake.

In case the liquid fertilizer precursor to be provided in step (a) comprises an aqueous solution of phosphoric acid, the phosphoric acid preferably has a strength corresponding to from 1 to 60% of $P_2O_5$ in water, more preferably from 5 to 55%.

In step (c), the weight percentage of elemental sulphur based upon the combined weight of the sulphur and the fertilizer and/or fertilizer precursor is preferably from 1 to 70 wt. %, more preferably from 2 to 50 wt. %, even more preferably from 4 to 40 wt. %.

Another advantage of the process of the invention is that by adding a ionic multifunctional additive in step (c), the micro-encapsulated sulphur particles produced are individually coated by a layer of the ionic multifunctional surfactant which prevents the sulphur particles to coalesce or agglomerate in further processing steps (d). Coalescence of dispersed liquid droplets occurs when individual dispersed droplets merge and form bigger droplets. Agglomeration occurs when droplets, liquid or solid, associate one with each to form bigger structures, often referred to as "raspberry" or "grape" structures.

In another embodiment of the present invention, additional plant nutrients are co-mixed in step (c) for the purpose of producing a multiple nutrient containing fertilizer and/or fertilizer precursor. Such plant nutrients may be selected, but not limited to potassium, phosphorus, nitrogen, boron, selenium, sodium, zinc, manganese, iron, copper, molybdenum, cobalt, calcium, magnesium and combinations thereof. These nutrients may be supplied in elemental form or in the form of salts such as oxides, hydroxides, sulphates, nitrates, halides or phosphates.

Accordingly, the present invention further provides a process for preparing an elemental sulphur-containing fertilizer comprising the steps of:

(a) providing a first stream comprising a liquid fertilizer and/or a liquid fertilizer precursor;

(b) providing a second stream comprising liquid elemental sulphur;

(c) mixing the first stream and the second stream in a mixing device in the presence of a multifunctional ionic surfactant and one or more additional plant nutrients to form an emulsion comprising micro-encapsulated elemental sulphur particles which are coated with a layer of the multifunctional ionic surfactant and dispersed in the fertilizer and/or the fertilizer precursor, whereby a temperature is applied which maintains the elemental sulphur substantially in the liquid form in the mixing device; and (d) subjecting the emulsion as obtained in step (d) to one or more further processing steps to obtain the elemental-sulphur fertilizer.

The one or more additional plant nutrients can be added to the mixing device in the form of one or more solid and/or liquid streams.

In yet another embodiment of the present invention in step (c) both a defoamer and one or more additional plant nutrients can be added.

Accordingly, the present invention also provides a process for preparing an elemental sulphur-containing fertilizer comprising the steps of:

(a) providing a first stream comprising a liquid fertilizer and/or a liquid fertilizer precursor;

(b) providing a second stream comprising liquid elemental sulphur;

(c) mixing the first stream and the second stream in a mixing device in the presence of a multifunctional ionic surfactant, one or more additional plant nutrients and a foam controlling additive to form a non-foaming emulsion comprising micro-encapsulated elemental sulphur particles which are coated with a layer of the multifunctional surfactant and dispersed in the fertilizer and/or the fertilizer precursor, whereby a temperature is applied which maintains the elemental sulphur substantially in the liquid form in the mixing device; and (d) subjecting the emulsion as obtained in step (d) to one or more further processing steps to obtain the elemental-sulphur fertilizer.

The present invention also relates to an elemental sulphur-containing fertilizer obtainable by the process according to the present invention. Such an elemental sulphur-containing fertilizer contains sulphur particles that display a unique particle size distribution.

The following non-limiting Examples are illustrative of the invention.

EXAMPLES

Comparative Example 1

Experiment 1

Preparation of Dispersion of Solid Elemental Sulphur in Phosphoric Acid

A dispersion mill, manufactured by Kady International (model OC-30, stainless steel, cooling jacketed, 20-60 gallons of working capacity, equipped with a 30 HP Drive and a variable frequency controller) was used to mill elemental sulphur. The dispersion mill was filled with 200-300 kg of 40-50 wt % $P_2O_5$ commercial fertilizer grade phosphoric acid.

The unit was started at minimum speed, and the required amount of solid sulphur pastilles (formed yellow bright chemical sulphur) was fed to the unit at a constant and fast pace, to make the targeted slurry concentration of 30 wt %.

Once all the sulphur was fed to the unit, the speed was increased to the planned value, and the chronometer was started to keep track of batch residence times. Data was registered during the residence time (e.g. current consumption, time, temperature, visual observations, etc). Also samples could be taken during the milling.

The temperature was maintained below 60° C. by the addition of cooling water to the jacket of the dispersion mill. A viscosity modifier was used (calcium lignosulphonate, an anionic surfactant available from Borregaard-Lignotech (Rothschild, Wis., USA), at a concentration of 0.9 wt % (active ingredient basis) based on the weight of the slurry being formed.

Once the residence time was completed, the speed was reduced to the minimum, final samples taken, and the product transferred to an agitated holding tank and the so produced sulphur particles analyzed for particle size distribution.

Table 1 shows the weight percentage of the elemental sulphur, the speed of the rotor, the duration of the milling, and the particle size distribution obtained.

TABLE 1

| Exp. No. | Conditions: % S in Slurry/ Residence Time (min) | Energy Input kWh/mT ES | Calcium Lignosulphonate wt % | % passing sieve opening in μm* | | | | | |
|---|---|---|---|---|---|---|---|---|---|
| | | | | 500 | 212 | 150 | 106 | 75 | 53 |
| 1 | 30% 18 min | 70.9 | 0.9 | 100 | 96.6 | 85 | 71.6 | 60.2 | 51.3 |

*Obtained by wet sieving method

Comparative Example 2

Experiments 2-3

Preparation of Dispersion of Elemental Sulphur in Phosphoric Acid Using Molten Sulphur Molten elemental sulphur was prepared in two flat-bottomed, steam-jacketed tanks (melters) having a working volume of 30 to 40 l; the melters were equipped with variable-speed agitators with two downward-thrust impellers on the shaft. The required amount of elemental sulphur (ES) pastilles (indicated in Table 2 below) was fed to the melters manually.

The same dispersion mill as used above (Kady OC-30) was filled with a predetermined amount (see again Table 2) of phosphoric acid and/or water, which directly correlated to the amount of molten ES needed to achieve the desired ES percentage in the batch. The rotor of the dispersion mill was turned on and once the speed of the rotor had reached approximately half of the maximum, the addition of molten ES was started. The molten ES addition time was under 2 minutes for experiment 2 and for 30% molten ES. After the addition of the molten ES, the grind time of the milling cycle began. Samples were collected after the target grind time was achieved.

In another embodiment (Experiment 3 in Table 2), the molten sulphur was added to an aqueous solution of phosphoric acid and left to "cure" (to convert the crystalline solid sulphur from one phase to other) during 16h.

The results for the experiments 2-3 using molten ES are indicated in Table 2 below.

TABLE 2

| Exp. No. | Conditions: % S in Slurry/ Cure time (h) Residence Time (min) | Energy Input kWh/mT ES | Calcium Lignosulphonate wt % | % passing sieve opening in μm* | | | | | |
|---|---|---|---|---|---|---|---|---|---|
| | | | | 500 | 212 | 150 | 106 | 75 | 53 |
| 2 | 30% 0 h 30 min | 150.8 | 0.09% | 99.8 | 84.2 | 74 | 65.2 | 58.5 | 52.2 |
| 3 | 30% 16 h 18 min | 87.4 | 0.09% | 100 | 95 | 88 | 76.1 | 65.5 | 58.7 |

*Obtained by wet sieving method

Example 3

Experiments 4-7; According to the Present Invention

Control of the Particle Size of Dispersed Elemental Sulphur in Hot Phosphoric Acid Merchant grade phosphoric acid from the Western United States had a strength of 50-55 wt % $P_2O_5$ and was supplied by JR Simplot. Merchant grade phosphoric acid was heated in a steam jacketed tank having a working volume of 120 l.

Molten elemental sulphur was prepared in a sulphur melter operated at 125-135° C.

Hot Merchant grade acid at temperatures above 115° C., molten sulphur, and a ionic additive (calcium lignosulphonate, an anionic surfactant available from Borregaard-Lignotech (Rothschild, Wis., USA), were fed continuously to a dispersion mill, manufactured by Kady International (model L-2000, stainless steel, working volume is 0.53 l, equipped with a 2.4 kW, 460 V, 3-phase, 60 Hz TEFC motor controlled by a 3.7 kW Variable Frequency Drive). The molten sulphur feed rate for all experiments was set to control the elemental sulphur concentration in the dispersion at 30 wt %. The additive feed rate for all experiments was varied to study the influence of the calcium lignosulphonate "dry basis" concentration on the dispersion properties. The remainder of the flow through the dispersion mill consisted of hot merchant grade acid.

The dispersion left the mixing device by an overflow opening allowing continuous operation. The position of the overflow allowed for calculating the hold-up of the mixing device. The energy input to the mixing device was changed by varying the Variable Frequency Drive (VFD), and the feed rate of the different dispersion constituents.

The overflowing dispersion was collected in a stainless steel vessel. Samples of the overflow were collected, diluted in water, which cooled the temperature of the dispersion to below the melting point of elemental sulphur, hence freezing the elemental sulphur shape and size.

A series of test was performed with a milling vessel having a working capacity of 0.53 L.

The results in Table 3 show the influence of ionic additive on particle size distribution for the two milling vessels.

Referring to FIG. 1, the results of the tests performed in Example 3 show the clear effect of calcium lignosulphonate on the particle size distribution of sulphur particles obtained from emulsions of micro-encapsulated molten sulphur in hot phosphoric acid.

The mixing device was fitted with a 4 l capacity stainless steel vessel and operated at a working volume of 2.5 l (experiment with 100% sulphur) and 1.5 l (experiment with mixtures of sulphur and filter cake).

An ionic additive was used in all tests and was Calcium Lignosulphonate as previously described.

When sulphur filter cake was incorporated, a second additive was added. The second additive was purposed at controlling any foaming that may occur during the milling sequence and was ArrMaz Custom Chemicals Custofloat CCS-500.

During the milling cycle, the mixing device was maintained at 135° C. by the circulation of a hot heat transfer liquid, paratherm-NF.

Table 4 gives the experimental parameters and the particle size distribution of the so obtained dispersions.

Table 4 shows that filter cake can be dispersed together with elemental sulphur in hot phosphoric acid. The addition of a defoamer second additive prevented any excessive foaming to occur when filter cake was

TABLE 4

| Exp. No. | % ES/ % ES from Filter cake/ Speed (Hz) Residence Time (min) | | | Energy Input kWh/mT ES | Ionic Additive wt % | Second Additive wt % | % passing sieve, opening in μm* | | | | | |
|---|---|---|---|---|---|---|---|---|---|---|---|---|
| | | | | | | | 500 | 212 | 150 | 106 | 75 | 53 |
| 8 | 20% | 0% | 45.8 Hz 1 min | 26.6 | 1.50% | NA | 100 | 100 | 100 | 100 | 99.9 | 99.9 |
| 9 | 5% | 15% | 33.4 Hz 1 min | 24.1 | 1.50% | 6.10% | 99.6 | 92.6 | 89.8 | 87 | 84.5 | 81.3 |

*Obtained by wet sieving method

TABLE 3

| Exp. No. | Conditions: % S in Slurry/ Speed (Hz) Residence Time (min) | | | Energy Input kWh/mT ES | Calcium Lignosulphonate wt % | Mean Particle size* - μm |
|---|---|---|---|---|---|---|
| 4 | 29% | 45.00 Hz | 2.8 min | 49 | 0.015% | 96 |
| 5 | 29% | 45.00 Hz | 2.8 min | 51 | 0.029% | 45 |
| 6 | 30% | 45.00 Hz | 2.8 min | 53 | 0.054% | 33 |
| 7 | 30% | 45.00 Hz | 2.8 min | 47 | 0.100% | 28 |

*Obtained with a Particle size analyzer. Horiba LA-300

Example 4

Experiments 8-9; According to the Present Invention

Batch Preparation of Elemental Sulphur Dispersions in Hot Phosphoric Acid

The same mixing device as in Experiments 5-7 was used to produce batches of micronized sulphur in hot phosphoric acid.

Hot phosphoric acid and molten elemental sulphur or hot phosphoric acid and mixtures of elemental sulphur and sulphur filter cake were prepared and heated in a convection oven at 125° C. for phosphoric acid and at 135° C. for molten sulphur and mixtures of molten sulphur and sulphur filter cake. The acid and sulphur were batch fed to the mixing device to make the targeted slurry concentration (20 to 30 wt %, depending on the experiment).

XPS spectra were acquired from reference samples of calcium and sodium lignosulphonate, and from a sample of particles collected in experiment 8 which were prepared from elemental sulphur in hot phosphoric acid with calcium lignosulphonate.

The reference samples gave composition and chemical state data in overall good agreement with expected structures, and formed a good basis from which to interpret the data from the sample.

The data from the sample of experiment 8 was consistent with the presence of a thin overlayer on the surface of the elemental sulfur, with the thin overlayer containing calcium lignosulphonate and a range of other species.

A simple calculation assuming a uniform overlayer gave an approximate thickness for this layer of calcium lignosulphonate and other materials of 12 nm.

Example 5

Experiments 10-14, According to the Invention

Batch Preparation of Elemental Sulphur Dispersions in Molten Urea

The same set up as used in experiments 8-9 was used in Examples 10-14 but molten urea was used as fertilizer stream. Sulphur and prilled urea were melted in a Blue convection oven at 140° C. prior to feeding to the dispersion mill.

The vessel used in all these experiments had a working capacity of 4 l and was operated at a working volume of 2.5 l.

Different ionic and non ionic additives were tested at different concentrations.

In one reference experiment, solid formed sulphur was fed directly in the dispersion mill.

In another reference experiment, no additive was used.

In one test, an additional solid fertilizer stream was introduced in the dispersion mill concomitantly to the urea and sulphur.

Table 5 gives the experimental parameters and the particle size distribution of the so obtained dispersions. When not mentioned, the additive used was Calcium Lignosulphonate.

Table 5 shows that the addition of an additive is preferred to obtain dispersions of fine micro-encapsulated sulphur particles (experiments 10 and 11-13) and that amongst the additive tested, Calcium Lignosulphonate is preferred. Furthermore, it shows (experiment 14) that other fertilizer streams such as Ammonium Sulphate can be efficiently incorporated in the dispersion containing urea and elemental sulphur while maintaining an energy efficient process and a high level of dispersion of the sulphur.

TABLE 5

| Exp. No. | Conditions: % S in Slurry/ Speed (Hz) Residence Time (min) | | | Energy Input kWh/mT ES | Additive wt % | AS** powder wt % | % passing sieve, opening in μm* | | | | | |
|---|---|---|---|---|---|---|---|---|---|---|---|---|
| | | | | | | | 500 | 212 | 150 | 106 | 75 | 53 |
| 10 | 10% | 28.1 Hz | 1.00 min | 33 | NA | NA | 73.9 | 58.0 | 41.8 | 27.2 | 18 | 11.5 |
| 11 | 10% | 29.9 Hz | 1.00 min | 36.8 | 0.10% | NA | 100 | 100 | 100 | 100 | 99.9 | 99.9 |
| 12*** | 10% | 26.6 Hz | 1.00 min | 37 | 0.10% | NA | 94.6 | 62.3 | 50.2 | 39.7 | 31.3 | 23.9 |
| 13**** | 10% | 25.3 Hz | 1.00 min | 28 | 1.00% | NA | 95.0 | 86.8 | 66.2 | 53.7 | 36.2 | 29.5 |
| 14 | 10% | 56.0 Hz | 1.00 min | 79.7 | 0.10% | 20% | 100 | 99.6 | 99.2 | 98.4 | 97.9 | 96.5 |

*Obtained by wet sieving method
**AS stands for Ammonium Sulphate, a fertilizer containing typically 21 wt % Nitrogen and 24 wt % Sulphur
***in Experiment 12, Toximul TA5, a non ionic surfactant of the family of Tallow amines, was used as additive
****in Experiment 13, Bentonite clay was used as an additive Tests were performed comparing the stability of suspensions obtained when no additive was added (according to experiment 10), and when calcium ligosulphonate was added (according to experiment 11) to determine if an ionic surfactant could be used to prevent coalescence and agglomeration of sulphur particles in molten urea.

Those stability tests consisted in sampling approx. 300 ml. of the experimental mixtures after the dispersion mill process was completed.

The weighted samples were placed in an oven at 125-140° C. without agitation for one hour with observations after 5, 10, 15, 30, 45, and 60 min. The stability samples were then allowed to cool down and solidify prior to the addition of water to the samples to further cool down the mixtures and dissolve their urea content. The sulphur (continuous or dispersed) phase was then observed and recorded.

The results of the above experiments show that when molten sulphur is mixed in molten urea without addition of calcium lignosulphonate, the sulphur separates almost immediately after the milling process is completed and forms a visible molten sulphur layer in the bottom of the beakers within a few minutes.

On the other hand, when calcium lignosulphonate was used, sulphur remains as discrete particles, even at high temperatures (125-140° C.).

In the presence of calcium lignosulphonate, mixtures containing up to 35% ES are relatively stable and not prone to separate immediately. Beaker tests need several minutes before a sediment can be observed in the bottom. This sediment, at molten urea conditions, is in the form of discrete particles (solid or liquid) that do not coalesce.

Finally, the remaining solid content of the mixture prepared in the presence of calcium lignosulphonate (after cooling down to below the melting point of urea and sulphur followed by washing with water) is fine discrete sulphur particles.

These tests confirm that calcium lignosulphonate, through micro-encapsulation, prevents coalescence of the micron-size sulphur particles prepared at temperatures above the sulphur melting point when the temperature of the mixture is maintained above the sulphur melting point. Further, calcium lignosulphonate prevents agglomeration of those particles when the mixture is cooled down to below the melting point of urea and sulphur and when urea is washed out by the addition of water.

That which is claimed is:

1. A process for the preparation an emulsion of elemental sulphur particles, said process comprising the steps of:
    (a) providing a first stream, having a first stream temperature in the range of from 60 to 200° C., and comprising urea that is in liquid form;
    (b) providing a second stream, having a second stream temperature in the range of from 120 to 150° C., and comprising liquid elemental sulphur; and
    (c) mixing the first stream and the second stream in a mixing device at a mixing temperature so that the elemental sulphur and urea are maintained in substantially liquid form in the mixing device and in the presence of a multifunctional ionic surfactant to form an emulsion comprising elemental sulphur particles which are coated with a layer of the multifunctional ionic surfactant and dispersed in the urea.

2. A process according to claim 1 in which the emulsion as obtained in step (c) is subjected to one or more further processing steps to obtain an elemental-sulphur fertilizer.

3. A process according to claim 2, wherein the one or more further processing steps comprise subjecting the emulsion to a forming process to obtain the elemental-sulphur-containing fertilizer.

4. A process according to claim 3, wherein the forming process is a granulating process, a prilling process, a compaction process, a tablet forming process or a compressing process.

5. A process according to claim 1, wherein the multifunctional ionic surfactant comprises an anioic surfactant.

6. A process according to claim 5, wherein the anionic surfactant comprises a lignosulphonate.

7. A process according to claim 1, wherein the mixing device in step (c) is a static mixer or a dispersion mill wherein a rotor turns within a slotted stator.

8. A process according to claim 7, wherein step (c) is carried out in a continuous mode of operation.

9. A process according to claim 1, wherein the particle size and particle size distribution of the elemental sulphur particles in the emulsion as obtained in step (c) is controlled.

10. A process for the preparation of elemental sulfur fertilizer, wherein said process comprises:
(a) providing a first stream comprising an aqueous solution of from 1 to 60% phosphoric acid, wherein said first stream has a first stream temperature in the range of from 80 to 150° C.;
(b) providing a second stream comprising elemental sulfur in molten form and at a second stream temperature in the range of from 115 to 200° C.;
(c) mixing said first stream and said second stream in a mixing device in the presence of a multifunctional ionic surfactant at a mixing temperature greater than 115° C. and at most 200° C. to form an emulsion comprising elemental sulfur particles coated with said multifunctional ionic surfactant, wherein said mixing temperature is such that said elemental sulfur is maintained in substantially liquid form in the mixing device, and wherein said first stream and said second stream are mixed in such proportions that the weight percentage of said elemental sulfur is in the range of from 1 to 70 wt. %, based on the combined weight of said elemental sulfur and said aqueous solution; and
(d) forming said emulsion into granulated fertilizer particles of solid elemental sulfur-containing fertilizer particles by a method selected from the group consisting of granulating, prilling, compacting, tableting, and compressing.

11. A process as recited in claim 10, wherein said multifunctional ionic surfactant is an anionic surfactant selected from the group consisting of soaps, sulphates, suphonates, phosphites, phosphates, phosphonates, ionic polymeric surfactants, and lignosulphonates.

12. A process as recited in claim 10, wherein said multifunctional ionic surfactant is a lignosulfphonate selected from the group consisting of ammonium lignosulphonate, sodium lignosulphonate, calcium lignosulphonate, and potassium lignosulphonate.

13. A process as recited in claim 10, wherein said lignosulfphonate is calcium lignosulphonate.

14. A process as recited in claim 10, wherein said elemental sulfur particles in said emulsion have an average particle size in the range of from 1 to 500 micrometers.

15. A process as recited in claim 10, wherein the amount of said multifunctional ionic surfactant mixed with said first stream and said second stream is such as to be from 0.001 to 5.0 wt. % of said multifunctional ionic surfactant of the total weight of said granulated fertilizer particles.

16. A process as recited in claim 10, wherein said aqueous solution contains from 5 to 55% phosphoric acid; said second stream temperature is in the range of from 120to 150° C.; said mixing temperature is greater than 120° C.; said elemental sulfur based on the combined weight of said elemental sulfur and said aqueous solution is in the range of from 4 to 40 wt. %; said elemental sulfur particles in said emulsion have an average particle size in the range of from 5 to 200 micrometers; and the amount of said multifunctional ionic surfactant mixed with said first stream and said second stream is such as to be from 0.01 to 1.5 wt. % of said multifunctional ionic surfactant of the total weight of said granulated fertilizer particles.

17. A process as recited in claim 11, wherein said aqueous solution contains from 5 to 55% phosphoric acid; said second stream temperature is in the range of from 120 to 150° C.; said mixing temperature is greater than 120° C.; said elemental sulfur based on the combined weight of said elemental sulfur and said aqueous solution is in the range of from 4 to 40 wt. %; said elemental sulfur particles in said emulsion have an average particle size in the range of from 5 to 200 micrometers; and the amount of said multifunctional ionic surfactant mixed with said first stream and said second stream is such as to be from 0.01 to 1.5 wt. % of said multifunctional ionic surfactant of the total weight of said granulated fertilizer particles.

18. A process as recited in claim 12, wherein said aqueous solution contains from 5 to 55% phosphoric acid; said second stream temperature is in the range of from 120 to 150° C.; said mixing temperature is greater than 120° C.; said elemental sulfur based on the combined weight of said elemental sulfur and said aqueous solution is in the range of from 4 to 40 wt. %; said elemental sulfur particles in said emulsion have an average particle size in the range of from 5 to 200 micrometers; and the amount of said multifunctional ionic surfactant mixed with said first stream and said second stream is such as to be from 0.01 to 1.5 wt. % of said multifunctional ionic surfactant of the total weight of said granulated fertilizer particles.

19. A process as recited in claim 13, wherein said aqueous solution contains from 5 to 55% phosphoric acid; said second stream temperature is in the range of from 120 to 150° C.; said mixing temperature is greater than 120° C.; said elemental sulfur based on the combined weight of said elemental sulfur and said aqueous solution is in the range of from 4 to 40 wt. %; said elemental sulfur particles in said emulsion have an average particle size in the range of from 5 to 200 micrometers; and the amount of said multifunctional ionic surfactant mixed with said first stream and said second stream is such as to be from 0.01 to 1.5 wt. % of said multifunctional ionic surfactant of the total weight of said granulated fertilizer particles.

20. A granulated fertilizer composition, comprising: granulated fertilizer particles formed from an emulsion of elemental sulfur particles coated with a multifunctional ionic surfactant, wherein said elemental sulfur particles coated with said multifunctional ionic surfactant of said emulsion are dispersed within an urea melt.

21. A granulated fertilizer composition as recited in claim 20, wherein said multifunctional ionic surfactant is an anionic surfactant selected from the group consisting of soaps, sulphates, suphonates, phosphites, phosphates, phosphonates, ionic polymeric surfactants, and lignosulphonates.

22. A granulated fertilizer composition as recited in claim 20, wherein said multifunctional ionic surfactant is a lignosulfphonate selected from the group consisting of ammonium lignosulphonate, sodium lignosulphonate, calcium lignosulphonate, and potassium lignosulphonate.

23. A granulated fertilizer composition as recited in claim 20, wherein said lignosulfphonate is calcium lignosulphonate.

24. A granulated fertilizer composition as recited in claim 20, wherein said elemental sulfur particles in said emulsion have an average particle size in the range of from 1 to 500 micrometers.

25. A granulated fertilizer composition as recited in claim 20, wherein the amount of said multifunctional ionic surfactant in said granulated fertilizer is in the range of from 0.001 to 5.0 wt. % of said granulated fertilizer particles.

26. A granulated fertilizer composition, comprising: granulated fertilizer particles formed from an emulsion of elemental sulfur particles coated with a multifunctional ionic surfactant, wherein said elemental sulfur particles coated with said multifunctional ionic surfactant of said emulsion are dispersed within an aqueous solution of from 1 to 60% phosphoric acid.

27. A granulated fertilizer composition as recited in claim 26, wherein said multifunctional ionic surfactant is an anionic surfactant selected from the group consisting of soaps, sulphates, suphonates, phosphites, phosphates, phosphonates, ionic polymeric surfactants, and lignosulphonates.

28. A granulated fertilizer composition as recited in claim 26, wherein said multifunctional ionic surfactant is a lignosulfphonate selected from the group consisting of ammonium lignosulphonate, sodium lignosulphonate, calcium lignosulphonate, and potassium lignosulphonate.

29. A granulated fertilizer composition as recited in claim 26, wherein said lignosulfphonate is calcium lignosulphonate.

30. A granulated fertilizer composition as recited in claim 26, wherein said elemental sulfur particles in said emulsion have an average particle size in the range of from 1 to 500 micrometers.

31. A granulated fertilizer composition as recited in claim 26, wherein the amount of said multifunctional ionic surfactant in said granulated fertilizer is in the range of from 0.001 to 5.0 wt. % of said granulated fertilizer particles.

* * * * *